May 7, 1968 P. HEDGEWICK ET AL 3,382,354
REFLECTOR FOR AUTOMOBILES

Filed July 21, 1965 3 Sheets-Sheet 1

INVENTORS
PETER HEDGEWICK &
WALLACE A. STANLEY
BY
Barnes, Kisselle, Raisch & Choate
ATTORNEYS

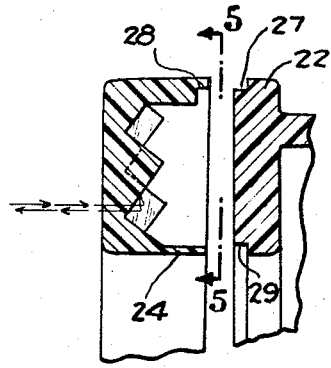
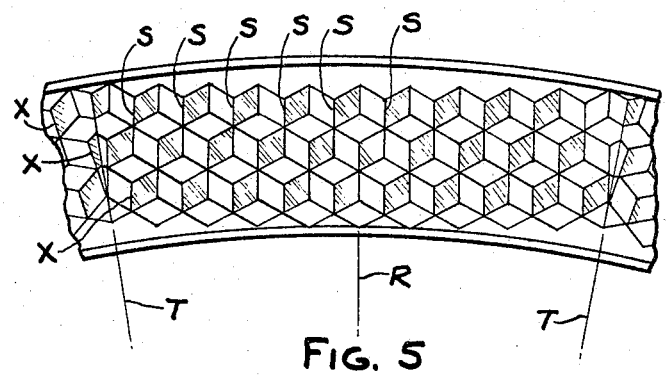
FIG. 4　　　FIG. 5
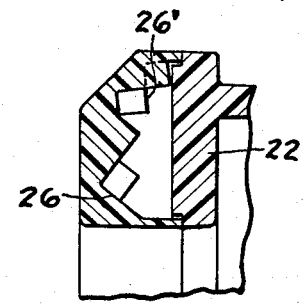
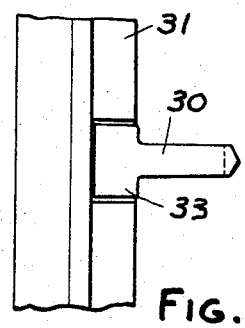
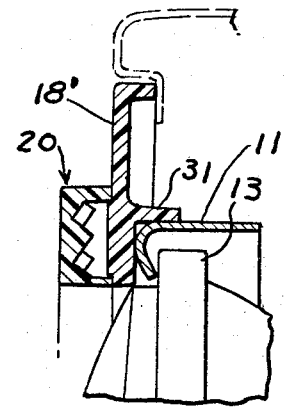
FIG. 6　　FIG. 9　　FIG. 10
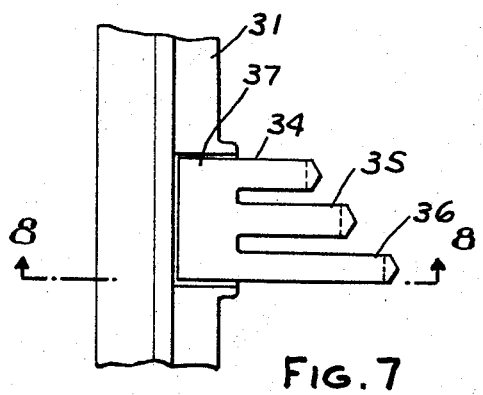
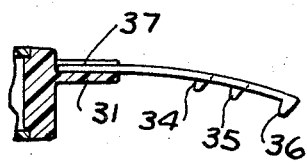
FIG. 7　　　　FIG. 8
INVENTORS
PETER HEDGEWICK &
WALLACE A. STANLEY
BY
*Barnes, Kisselle, Raisch & Choate*
ATTORNEYS May 7, 1968 P. HEDGEWICK ET AL 3,382,354
REFLECTOR FOR AUTOMOBILES
Filed July 21, 1965 3 Sheets-Sheet 3

INVENTORS
PETER HEDGEWICK &
WALLACE A. STANLEY
BY
Barnes, Kisselle, Raisch & Choate
ATTORNEYS 3,382,354
REFLECTOR FOR AUTOMOBILES
Peter Hedgewick, 2375 Windermere Road, Windsor, Ontario, Canada, and Wallace A. Stanley, 5215 Winlane Drive, Bloomfield Hills, Mich. 48013
Filed July 21, 1965, Ser. No. 473,761
12 Claims. (Cl. 240—41.38)

ABSTRACT OF THE DISCLOSURE

The reflector disclosed herein comprises a first substantially continuous ring of transparent material which has a smooth outer surface and an inner surface formed with a plurality of reflecting prisms such that light passing through the outer surface is reflected by the prisms on the inner surface back out through the outer surface and a second ring of material which is joined to the first ring in spaced adjacent relation. Means are shown for mounting the rings so that the rings encircle the headlamp of an automobile.

---

This invention relates to reflectors for automobiles and particularly to a reflector positioned adjacent the headlamp of an automobile.

A major problem in automobile safety on the highway at night exists where one or more of the headlamps of the automobile is inoperative and the driver of an oncoming vehicle is unable to distinguish between an automobile or a different vehicle, such as a motorcycle, which has a single headlamp, thereby resulting in inability to judge the width of, or distance from, the oncoming vehicle.

It is therefore an object of the invention to provide a reflector which is mounted on the automobile and surrounds the headlamp so that when the headlamp is inoperative, the light from the headlamps of the oncoming vehicle will produce a reflection back to the eyes of the oncoming driver.

It is a further object of the invention to provide such a reflector which will efficiently reflect the light back to the eyes of the oncoming driver.

It is a further object of the invention to provide such a reflector which can be easily mounted on conventional headlamps, which are retained and positioned by a retaining ring and have a shroud surrounding the retaining bracket, without interfering with such mounting of the headlamp.

It is a further object of the invention to provide such a reflector which does not require the use of tools.

It is a further object of the invention to provide such a reflector which is of such a construction that it can be mounted on vehicles having retaining rings for the headlamps which are of differing axial widths.

In the drawings:

FIG. 4 is a fragmentary exploded view showing parts of a reflector prior to assembly.

FIG. 5 is a fragmentary view taken along the line 5—5 in FIG. 4.

FIG. 6 is a side elevational view of a portion of the reflector.

FIG. 7 is a view similar to FIG. 6 of a modified form of reflector.

FIG. 8 is a sectional view taken along the line 8—8 in FIG. 7.

FIG. 9 is a sectional view similar to FIG. 4 of a modified assembled reflector embodying the invention.

FIG. 10 is a sectional view similar to FIGS. 4 and 9 of a combined retaining ring and reflector in position on a headlight.

Figure 1:
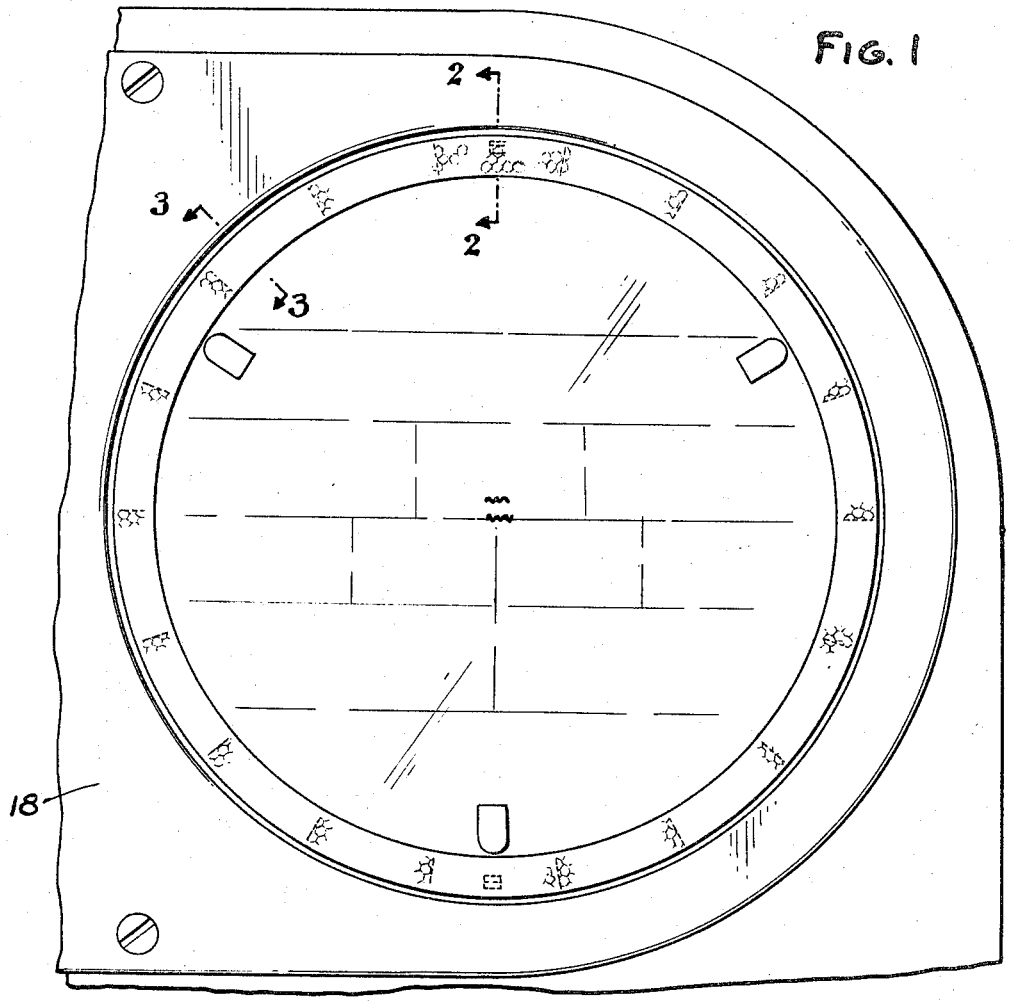
FIG. 1 is a fragmentary elevational view of a vehicle embodying the invention.
Figure 3:
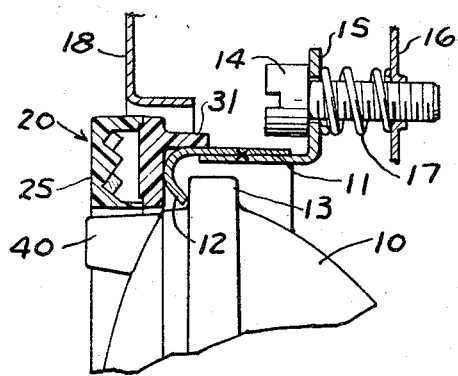
FIG. 3 is a fragmentary sectional view taken along the line 3—3 in FIG. 1.
Figure 2:
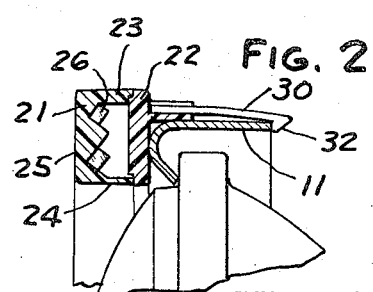
FIG. 2 is a fragmentary sectional view on an enlarged scale taken along the line 2—2 in FIG. 1.
Figure 11:
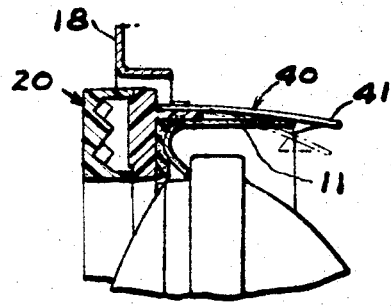
FIG. 11 is a sectional view similar to FIGS. 4, 9 and 10 of a further modified form of reflector.
Figure 13:
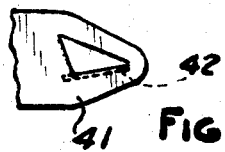
FIG. 13 is a fragmentary plan view of the free end of one of the retaining fingers of the reflector shown in FIGS. 11 and 12.
Figure 12:
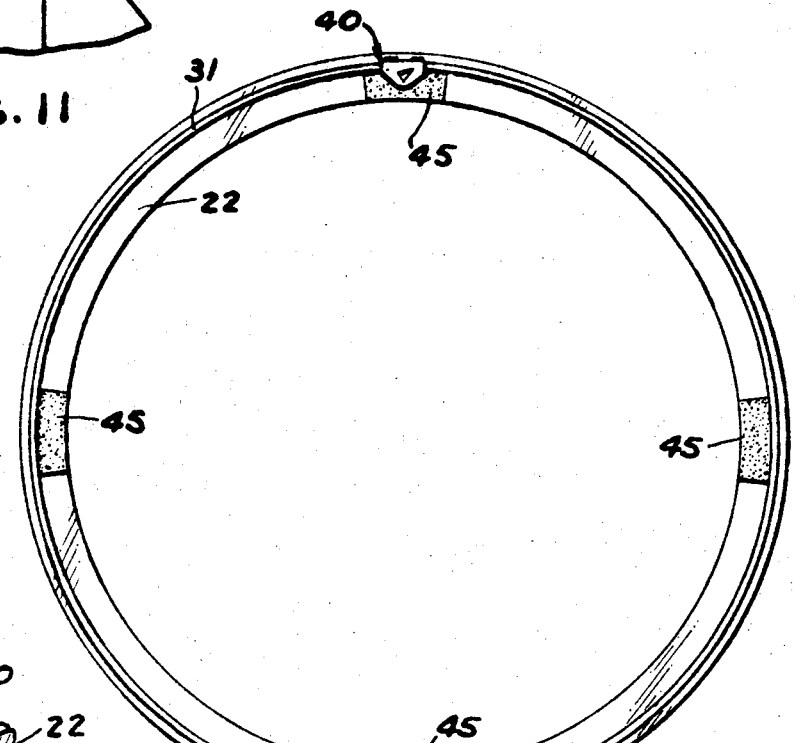
FIG. 12 is a rear plan view of the reflector shown in FIG. 11.
Figure 14:
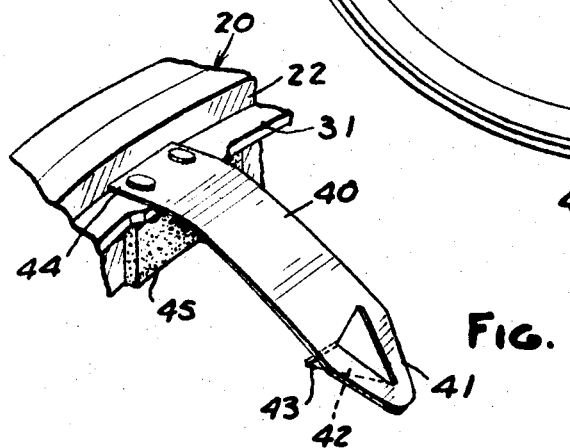
FIG. 14 is a fragmentary perspective view of a portion of the reflector shown in FIGS. 11–13.

Referring to FIGS. 1–3, the reflector embodying the invention is adapted to be mounted on a vehicle which has a conventional sealed beam headlight 10 that is retained in position by a continuous sheet metal ring or bracket 11 having a flange 12 that engages a peripheral bead 13 on the headlamp 10. The axis of the headlamp 10 with respect to the vehicle is conventionally adjusted by circumferentially spaced screws 14 that extend through flanges 15 on ring 11 and are threaded into a plate 16 forming part of the vehicle body. A spring 17 is interposed between each flange 15 and plate 16. A plurality of the screws 14 are provided in circumferentially spaced relation about the periphery of the headlamp 10 in accordance with conventional practice and a sheet metal or plastic shroud 18 is provided in closely spaced relation to the periphery of the headlamp 10.

In accordance with the invention, a reflector 20 is mounted on the sheet metal ring 11 and comprises an outer wall 21 and an inner wall 22 joined by radially spaced walls 23, 24 on the outer wall 21 that extend to the inner wall 22.

As shown in FIG. 1, the outer wall 21 is a continuous ring of light transmitting material, such as acrylic plastic, and has a smooth outer surface 25 and an inner surface formed with the plurality of prisms 26 throughout its entire periphery (FIGS. 4, 5). Each of the prisms 26 is preferably cubic in accordance with the type of prisms shown in the patents to Stimson 1,591,572 and 1,906,655 such that light entering through the surface 25 is reflected by the three surfaces of each cubic prism back outwardly in a parallel direction. Such prisms, when viewed directly, have hexagonal side edges at the terminus of reflecting surfaces as viewed in FIG. 5.

In order to obtain the maximum number of complete prisms and thereby obtain maximum reflection, the prisms are provided in groups having a limited arcuate extent X as shown in FIG. 5. The prisms are arranged in rows with the axes of the circumferentially adjacent prisms in each group lying in straight lines and two of the side edges S of the prisms in each row being parallel to a radius R of the reflector ring. The circumferential extremities of each group are beveled along radial lines T.

It has been found that by this arrangement the maximum number of complete prisms is provided along the circumference of the reflector. For example, in the case of a reflector for a 7-inch diameter headlamp, 18 groups of prisms are provided around the reflector for maximum efficiency. It has further been found that such an arrangement of reflectors is 41 percent more effective than where the side edges S are in radially aligned position and the axes of the adjacent prisms are not provided in straight lines.

The axes of the cubic prisms are preferably perpendicular to the surface 25. As shown in the modified form of the invention in FIG. 9, additional prisms 26' may have their axes angularly related to the axes of the prisms 26 to produce a wider cone of reflection of light from the headlamp of an oncoming vehicle.

The outer wall 21 and associated radially spaced walls 23, 24 are preferably molded in a single piece with the prisms 26 along the entire inner surface of the wall 21.

As shown in FIG. 4, the inner wall 22 is formed with a shoulder 27 that engages a recess 28 in the wall 23 and a shoulder 29 that engages the wall 24. The inner wall 22 is preferably formed of plastic and the two walls 21, 22 are joined to one another by adhesive or preferably by spin welding to form a hermetically sealed space between the walls 21, 22.

Referring to FIGS. 1, 3 and 6, flexible retaining fingers 30 are mounted at circumferentially spaced points on the outer periphery of an axial flange 31 on wall 22. Each finger 30 is formed with an inwardly extending protrusion 32 that engages the axially innermost edge of the retaining ring 11 of the headlamp. The reflector is mounted on ring 11 by moving the fingers 30 axially inwardly around the ring 11 and permitting the protrusions to engage the ring 11 and cause the wall 22 to abut flange 12 of ring 11. The fingers 30 include base portions 33 that are adhered to the flange 31. Fingers 30 and base portions 33 can be made of a single piece of suitable plastic material that permits flexing of the fingers, such as nylon.

As shown in FIG. 3, the reflector embodying the invention has a low profile so that the outer surface 25 is spaced inwardly of the outermost portion of the protrusions 40 that are customarily found on sealed beam headlamps to facilitate aiming of the headlamps.

It can be seen that by this arrangement the reflector ring is mounted in position on the conventional headlamp mounting ring or bracket 11 without interfering with the mounting of the headlamp or the shroud 18 which surrounds the headlamp. By providing a hermetic seal between the walls 21, 22, the entry of water or dirt in the area of the prisms 26 is prevented, thereby obviating the deleterious effects of moisture and dirt on the reflecting properties of the prisms.

When the lights of an oncoming vehicle strike the reflector, the light is reflected back by the prisms toward the eyes of the oncoming driver. The reflector does not interfere with the normal operation of the headlamp which is surrounds.

It has been found that the mountings brackets 11 of different car manufacturers have different axial widths. In order to accommodate vehicles of different manufacture wherein the ring 11 has varying axial widths, a modified finger arrangement such as shown in FIGS. 7 and 8 can be used wherein a plurality of flexible fingers 34, 35, 36 of different lengths are formed with a base 37 adhered to the flange 31. By such arrangement, the same reflector can be mounted on vehicles having rings 11 of different axial widths, one of the fingers 34, 35, 36 being of proper length to engage the edge of the ring 11 and bring the wall 22 in abutting relation with the flange 12 on ring 11.

In the modified form of the invention shown in FIG. 10, the shroud 18' and the reflector 20 are both made of plastic material interconnected by an integral annular web 4. In this arrangement, the retaining fingers 30 are eliminated.

In the form of the invention shown in FIGS. 11–14, the retaining fingers 40 comprise flexible members that extend generally axially with the free ends 41 extending radially inwardly. The fingers 40 are provided at diametrically opposed points on reflector 20. Each finger 40 includes a downwardly and inwardly struck triangular tab 42 having an apex 43 which extends toward the reflector. The fingers 40 are made of a suitable flexible material such as stainless steel and are mounted on the flange 31 by suitable means such as rivets at the other ends 44. Resilient pads 45 of suitable material, such as polyurethane foam, are provided at circumferentially spaced points on the flange 31.

When it is desired to mount the reflector, the fingers 40 are moved axially between the shroud 18 and the mounting ring 11. In this movement, the fingers 40 flex outwardly. As the tabs 42 reach the edge of the mounting ring 11, the pads 45 engage the front of the mounting ring 11 and are compressed. Further compression of the pads 45 permits the fingers 40 to move sufficiently so that the free ends 43 of the tabs 42 passes over the edge of the mounting ring 11 and engage the edge of the mounting ring 11 to hold the reflector in position. The resiliency of the pads 45 insures continued engagement of the tabs 42 with the mounting ring and minimizes any tendency to create undesirable noises.

As in the form of the invention shown in FIGS. 7 and 8, a plurality of fingers 40 of different lengths can be provided in order that the reflector can be mounted on vehicles having mounting brackets with different axial widths.

It can thus be seen that there has been provided a reflector which will efficiently reflect the light back to the eyes of an oncoming driver; which can be applied to a vehicle without changing the construction thereof; which can be applied without tools; and which will accommodate vehicle lamp mounting structures of differing dimensions.

We claim:

1. For use with a headlamp of an automobile wherein the headlamp is maintained in position by a retaining bracket that engages the periphery of the headlamp and a shroud is provided around the periphery of the headlamp, the combination comprising:

a substantially continuous first ring of transparent material, said ring having a substantially smooth outer surface and an inner surface formed with a plurality of reflecting prisms such that light passing through said outer surface is reflected by the prisms on said inner surface back out through said outer surface, a second ring of material, means for joining said first and second rings to provide a unit with said second ring in spaced adjacent relation to said first ring, and a plurality of fingers mounted in circumferentially spaced relation on said second ring and projecting axially thereof for engaging the retaining bracket of the headlamp, at least one of said fingers being flexible to permit said reflector to be placed on said retaining bracket by an axial movement with said finger flexing radially outwardly and thereafter engaging the inner edge of the retaining bracket.

2. For use with a headlamp of an automobile wherein the headlamp is maintained in position by a retaining bracket that engages the periphery of the headlamp and a shroud is provided around the periphery of the headlamp, the combination comprising:

a substantially continuous first ring of transparent material, said ring having a substantially smooth outer surface and an inner surface formed with a plurality of reflecting prisms such that light passing through said outer surface is reflected by the prisms on said inner surface back out through said outer surface, a second ring of material, means for joining said first and second rings to provide a hermetically sealed unit with said second ring in spaced adjacent relation to said first ring, and a plurality of fingers mounted in circumferentially spaced relation on said second ring and projecting axially thereof for engaging the retaining bracket of the headlamp, at least one of said fingers being resilient to permit said reflector to be placed on said retaining bracket by an axial movement with said finger flexing radially outwardly and thereafter engaging the inner edge of the retaining bracket.

3. For use with a headlamp of an automobile wherein the headlamp is maintained in position by a retaining bracket that engages the periphery of the headlamp and a shroud is provided around the periphery of the headlamp, the combination comprising:

a substantially continuous first ring of transparent material, said ring having a substantially smooth outer surface and an inner surface formed with a plurality of reflecting prisms such that light passing through said outer surface is reflected by the prisms on said inner surface back out through said outer surface, a second ring of material, means for joining said first and second rings to provide a unit with said second ring in spaced adjacent relation to said first ring, and a plurality of sets of fingers mounted in circumferentially spaced relation on said second ring and projecting differing lengths axially thereof for engaging the retaining ring of the headlamp, at least one of said fingers of each set being flexible to permit said reflector to be placed on said retaining bracket by an axial movement with said finger flexing radially outwardly and thereafter engaging the inner edge of the retaining bracket.

4. For use with a headlamp of an automobile wherein the headlamp is maintained in position by a retaining bracket that engages the periphery of the headlamp and a shroud is provided around the periphery of the headlamp, the combination comprising:

a substantially continuous first ring of transparent material, said first ring having an outer wall with a smooth outer surface and an inner surface formed with a plurality of reflecting prisms such that light passing through said outer surface is reflected by the prisms on said inner surface back out through said outer surface, a second ring comprising an inner wall of material, and radially spaced walls integral with said outer wall interconnecting said outer and inner walls to form a hermetically sealed space adjacent said prisms, and a plurality of fingers mounted in circumferentially spaced relation on said second ring and projecting axially thereof for engaging the retaining bracket of the headlamp, at least one of said fingers being flexible to permit said reflector to be placed on said retaining bracket by an axial movement with said finger flexing radially outwardly and thereafter engaging the inner edge of the retaining bracket.

5. For use with a headlamp of an automobile wherein the headlamp is maintained in position by a retaining bracket that engages the periphery of the headlamp and a shroud is provided around the periphery of the headlamp, the combination comprising:

a substantially continuous first ring of transparent material, said ring having a substantially smooth outer surface and an inner surface formed with a plurality of reflecting prisms having a cubic configuration such that light passing through said outer surface is reflected by the prisms on said inner surface back out through said outer surface, said prisms being grouped circumferentially of said ring with the axes of the circumferentially adjacent prisms in each group lying in straight lines, the side edges of the surfaces of each prism defining a hexagon, each prism having two of said side edges lying along lines parallel to the radius of said ring, a second ring of material, means for joining said first and second rings to provide a unit with said second ring in spaced adjacent relation to said first ring, and a plurality of fingers mounted in circumferentially spaced relation on said second ring and projecting axially thereof for engaging the retaining bracket of the headlamp, at least one of said fingers being flexible to permit said reflector to be placed on said retaining bracket by an axial movement with said finger flexing radially outwardly and thereafter engaging the inner edge of the retaining bracket.

6. For use with a headlamp of an automobile wherein the headlamp is maintained in position by a retaining bracket that engages the periphery of the headlamp and a shroud is provided around the periphery of the headlamp, the combination comprising:

a substantially continuous ring of transparent material, said ring having a substantially smooth outer surface and an inner surface formed with a plurality of reflecting prisms having a cubic configuration such that light passing through said outer surface is reflected by the prisms on said inner surface back out through said outer surface, said prisms being provided in a plurality of groups circumferentially of said ring with the axes of the circumferentially adjacent prisms in each group lying in straight lines, the side edges of the surfaces of each prism defining a hexagon, each prism in each group having two of said side edges lying along lines parallel to the radius of said ring.

7. For use with a headlamp of an automobile wherein the headlamp is maintained in position by a retaining bracket that engages the periphery of the headlamp and a shroud is provided around the periphery of the headlamp, the combination comprising:

a substantially continuous first ring of transparent material, said ring having a substantially smooth outer surface and an inner surface formed with a plurality of reflecting prisms having a cubic configuration such that light passing through said outer surface is reflected by the prisms on said inner surface back out through said outer surface, said prisms being grouped circumferentially of said ring with the axes of the circumferentially adjacent prisms in each group lying in straight lines, the side edges of the surfaces of each prism defining a hexagon, each prism having two of said side edges lying along lines parallel to the radius of said ring, a second ring of material, means for joining said first and second rings to provide a hermetically sealed unit with said second ring in spaced adjacent relation to said first ring, and a plurality of fingers mounted in circumferentially spaced relation on said inner ring and projecting axially thereof for engaging the retaining bracket of the headlamp, at least one of said fingers being resilient to permit said reflector to be placed on said retaining bracket by an axial movement with said finger flexing radially outwardly and thereafter engaging the inner edge of the retaining bracket.

8. For use with a headlamp of an automobile wherein the headlamp is maintained in position by a retaining bracket that engages the periphery of the headlamp and a shroud is provided around the periphery of the headlamp, the combination comprising:

a substantially continuous first ring of transparent material, said ring having a substantially smooth outer surface and an inner surface formed with a plurality of reflecting prisms such that light passing through said outer surface is reflected by the prisms on said inner surface back out through said outer surface, a second ring of material, means for joining said first and second rings to provide a unit with said second ring in spaced adjacent relation to said first ring, and a plurality of fingers mounted in circumferentially spaced relation on said second ring and projecting axially thereof for engaging the retaining bracket of the headlamp, the free end of each finger extending radially inwardly, each finger being formed with a struck out tab that is adapted to engage the retaining bracket so that the reflector may be placed on the retaining bracket by an axial movement with the fingers flexing radially outwardly and thereafter radially inwardly to cause the tabs to engage the inner edge of the retaining bracket.

9. For use with a headlamp of an automobile wherein the headlamp is maintained in position by a retaining bracket that engages the periphery of the headlamp and a shroud is provided around the periphery of the headlamp, the combination comprising:

a substantially continuous first ring of transparent material, said ring having a substantially smooth outer surface and an inner surface formed with a plurality of reflecting prisms having a cubic configuration such that light passing through said outer surface is reflected by the prisms on said inner surface back out through said outer surface, said prims being groups circumferentially of said ring with the axes of the circumferentially adjacent prisms in each group lying in straight lines, the side edges of the surfaces of each prism defining a hexagon, each prism having two of said side edges lying along lines parallel to the radius of said ring, a second ring of material, means for joining said first and second rings to provide a unit with said second ring in spaced adjacent relation to said first ring, and a plurality of flexible fingers mounted on said reflector and extending generally axially, the free end of each finger extending radially inwardly, each finger being formed with a struck out tab that is adapted to engage the retaining bracket so that the reflector may be placed on the retaining bracket by an axial movement with the fingers flexing radially outwardly and thereafter radially inwardly to cause the tabs to engage the inner edge of the retaining bracket.

10. For use with a headlamp of an automobile wherein the headlamp is maintained in position by a retaining bracket that engages the periphery of the headlamp and a shroud is provided around the periphery of the headlamp, the combination comprising:

a substantially continuous ring of transparent material, said ring having a substantially smooth outer surface and an inner surface formed with a plurality of reflecting prisms such that light passing through said outer surface is reflected by the prisms on said inner surface back out through said outer surface, and a plurality of flexible fingers mounted on said reflector and extending generally axially, the free end of each finger extending radially inwardly, each finger being formed with a struck out tab that is adapted to engage the retaining bracket so that the reflector may be placed on the retaining bracket by an axial movement with the fingers flexing radially outwardly and thereafter radially inwardly to cause the tabs to engage the inner edge of the retaining bracket.

11. For use with a headlamp of an automobile, the combination comprising:

a substantially continuous first ring of transparent material, said ring having a substantially smooth outer surface and an inner surface formed with a plurality of reflecting prisms having a cubic configuration such that light passing through said outer surface is reflected by the prisms on said inner surface back out through said outer surface, said prisms being groups circumferentially of said ring with the axes of the circumferentially adjacent prisms in each group lying in straight lines, the side edges of the surfaces of each prism defining a hexagon, each prism having two of said side edges lying along lines parallel to the radius of said ring, a second ring of material, means for joining said first and second rings to provide a unit with said second ring in spaced adjacent relation to said first ring, and means for mounting said rings about a headlamp.

12. For use with a headlamp of an automobile, the combination comprising:

a shroud adapted to be provided around the periphery of the headlamp, a substantially continuous ring of transparent material within said shroud, said ring having a substantially smooth outer surface and an inner surface formed with a plurality of reflecting prisms such that light passing through said outer surface is reflected by the prisms on said inner surface back out through said outer surface, a second ring of material, means for joining said first and second rings to provide a unit with said second ring in spaced adjacent relation to said first ring, and an integral annular web joining said ring and said shroud.

References Cited

UNITED STATES PATENTS

| | | | |
|---|---|---|---|
| 1,705,943 | 3/1929 | Rolph et al. | 240—106 |
| 1,751,070 | 3/1930 | Boots et al. | 240—8.3 |
| 2,082,658 | 6/1937 | Sauer | 240—8.3 |
| 2,216,325 | 10/1940 | Ryder | 350—103 |
| 2,539,819 | 1/1951 | Dominick | 240—46.59 |
| 2,601,127 | 6/1952 | Rosenstein | 240—106 |
| 2,798,147 | 7/1957 | Orsatti | 240—8.3 |
| 3,096,684 | 7/1963 | Kegg et al. | 240—106 |

NORTON ANSHER, *Primary Examiner.*

J. W. PRICE, WINDHAM M. FRYE,
*Assistant Examiners.*